United States Patent [19]

Kato et al.

[11] 4,413,295
[45] Nov. 1, 1983

[54] MAGNETIC HEAD

[75] Inventors: Hiroaki Kato, Machida; Junji Hamana, Chichibu; Akeo Sakai, Yokoze; Yoshio Kawakami, Chichibu; Atsushi Goto, Hanno; Saichiro Amano, Yokohama, all of Japan

[73] Assignee: Canon Kabushiki Kaisha, Tokyo; Canon Denshi Kabushiki Kaisha, Saitama, both of Japan

[21] Appl. No.: 372,556

[22] Filed: Apr. 28, 1982

Related U.S. Application Data

[63] Continuation of Ser. No. 230,107, Jan. 29, 1981, Pat. No. 4,368,496, which is a continuation of Ser. No. 14,849, Feb. 26, 1979, abandoned.

[30] Foreign Application Priority Data

Mar. 1, 1978 [JP] Japan .................................. 53-23221
Mar. 7, 1978 [JP] Japan .................................. 53-25611
Jan. 23, 1979 [JP] Japan .................................. 54-7321

[51] Int. Cl.$^3$ ............................ G11B 3/08; G11B 5/08
[52] U.S. Cl. ................................... 360/110; 360/120; 360/126
[58] Field of Search .................. 360/110, 119–120, 360/122, 126; 428/900

[56] References Cited

U.S. PATENT DOCUMENTS 3,683,126  8/1972  Krause .................. 360/126

FOREIGN PATENT DOCUMENTS 1440968  6/1976  United Kingdom ............... 428/900
504234   4/1974  U.S.S.R. ........................... 360/126
601746  11/1976  U.S.S.R. ........................... 360/122

*Primary Examiner*—John H. Wolff
*Attorney, Agent, or Firm*—Fitzpatrick, Cella, Harper & Scinto

[57] ABSTRACT

The present invention provides a magnetic head of which magnetic core is composed of thin plates of a high magnetic permeability, each provided with an adhesive layer comprising a granular substance. In such structure, the stress relaxation achieved by said granular substance prevents the loss of effective magnetic permeability of said core, thereby improving the high frequency characteristics. Also the presence of said granular substance realizes a hardness in the vicinity of said adhesive higher than that of said thin plates of a high magnetic permeability, thereby improving the abrasion resistance of said core. Furthermore said adhesive layer is rendered satisfactorily thinner than said thin plate to prevent the loss of sensitivity. Furthermore a fixing member for supporting said core is made of such a composition as to be evenly abraded with said core, thereby preventing deformation of the head resulting from abrasion by the recording medium and thus enabling to maintain the initial electromagnetic converting characteristics over a prolonged period.

6 Claims, 10 Drawing Figures

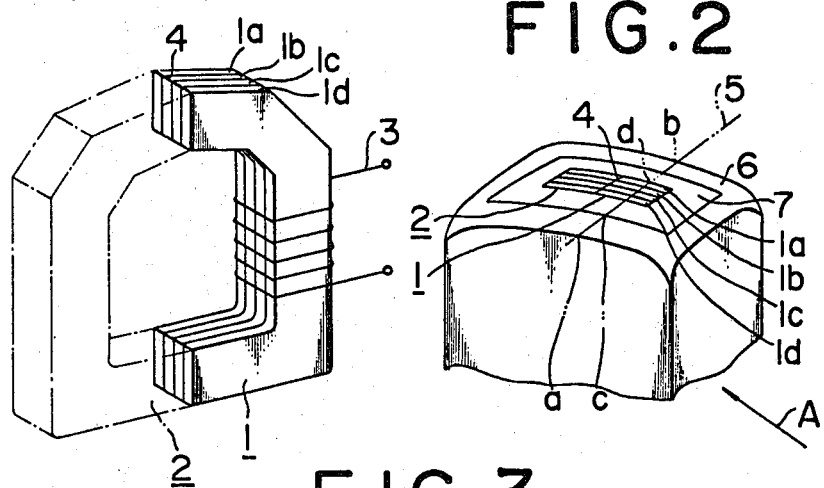
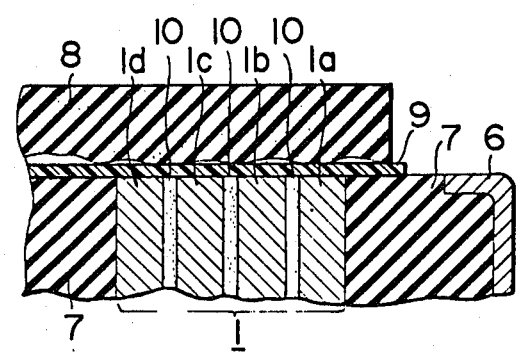
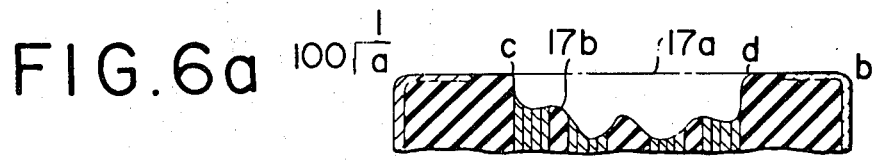
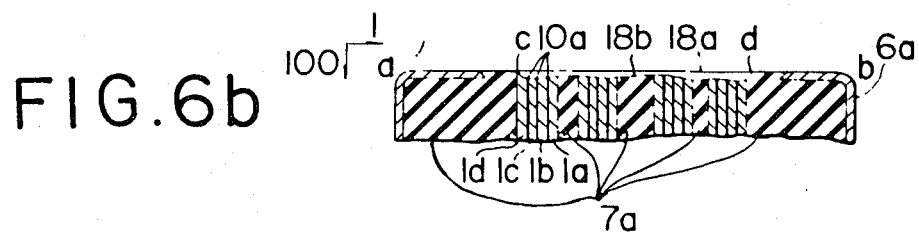

MAGNETIC HEAD

This is a continuation, of application Ser. No. 230,107, filed Jan. 29, 1981, now U.S. Pat. No. 4,368,496 which was a continuation of application Ser. No. 14,849, filed Feb. 26, 1979, abandoned.

BACKGROUND OF THE INVENTION

1. Field of the Invention

The present invention relates to a magnetic head improved in the electromagnetic converting characteristics and abrasion resistance by providing thin plates of a high magnetic permeability with an adhesive layer comprising a granular substance.

2. Description of the Prior Art

The magnetic head, being designed for information recording and playback by friction contact with a magnetic tape, is gradually abraded at its contact surface with the magnetic tape to lose the recording performance in the higher frequency region in the beginning and to eventually result in a deterioration of the recording performance over the entire frequency range as the abrasion proceeds. Such drawback can be prevented by increasing the abrasion resistance to reduce the amount of abrasion and to cause the abrasion to occur in a uniform manner. For example in case of an audio cassette tape recorder with a recording track width of ca. 0.6 mm, the stereo magnetic head is composed of four laminated thin plates each 0.15 mm thick to obtain the above-mentioned track width, since a single plate of a 0.6 mm thickness will result in a significant eddy current loss, leading to a loss in the electromagnetic converting efficiency. In such structure said laminated thin plates have to be mutually insulated electrically, and are therefore composed of a material of a high magnetic permeability such as permalloy or sendust each provided on the surfaces thereof with a resinous insulating adhesive. Consequently the track face of the magnetic head is composed of an alternating laminated structure of said material of high magnetic permeability and said adhesive layer. Such laminated structure is generally obtained by forming a thin layer for example of an epoxy resin, for example by spraying, on thin plates of a high magnetic permeability and compressing such plates under heating. In such structure, however, said resin layer tends to generate a stress along the surface of said thin plates at the hardening of resin after lamination, thus resulting in a deterioration of magnetic properties. On the other hand a resin with a low stress generation generally provides an excessively low adhesive force. In the conventional magnetic heads said material of high magnetic permeability has been changed from permalloy to less-abradable materials such as hard permalloy or sendust while said adhesive has been of a lower abrasion resistance than that of said material of high magnetic permeability in order to ensure a satisfactory adhesion, but it is to be noted that the abrasion resistance of the entire magnetic core is also affected by the abrasion resistance of said adhesive. Furthermore said magnetic core, after coil winding, is inserted into a head case and fixed therein by means of a fixing material to be filled between said core and said case, so that a part of said fixing material will constitute, together with said magnetic core, the contact face with the magnetic tape. It is therefore necessary, in order to maintain the initial performance of the head for a prolonged period, that said core and said fixing material are evenly abraded to always maintain a flat contact face. In the conventional magnetic heads, however, the service life has been inevitably limited due to unbalanced abrasion of the head core and the fixing material.

SUMMARY OF THE INVENTION

A first object of the present invention is to provide a magnetic head of improved high frequency characteristics through relaxation of stress generated at the hardening of the adhesive thereby preventing the loss in the effective magnetic permeability of the core.

A second object of the present invention is to provide a magnetic head with an improved abrasion resistance of the core by rendering said adhesive harder than the thin plates of a high magnetic permeability constituting the core.

A third object of the present invention is to provide a magnetic head wherein the sensitivity loss resulting from the presence of said adhesive is reduced.

A fourth object of the present invention is to provide a magnetic head wherein the core and the fixing material present therearound are evenly abraded to ensure stable electromagnetic converting performance over a prolonged period.

A fifth object of the present invention is to provide a magnetic head of a prolonged service life.

BRIEF DESCRIPTION OF THE DRAWINGS

FIG. 1 is a perspective view of a head element adapted for use in the present invention and formed by winding coil on a core;

FIG. 2 is a perspective view of the head element shown in FIG. 1 placed in a head casing;

FIG. 3 is a cross-sectional view of the magnetic head of the present invention in a state in contact with a magnetic tape and a tape pad;

FIG. 6(a) is a partial cross-sectional view of a conventional multi-element magnetic head showing an abraded state thereof; and FIG. 6(b) is a partial cross-sectional view of a multi-element embodiment of the magnetic head of the present invention showing an abraded state thereof.

DESCRIPTION OF THE PREFERRED EMBODIMENTS

Figure 4:
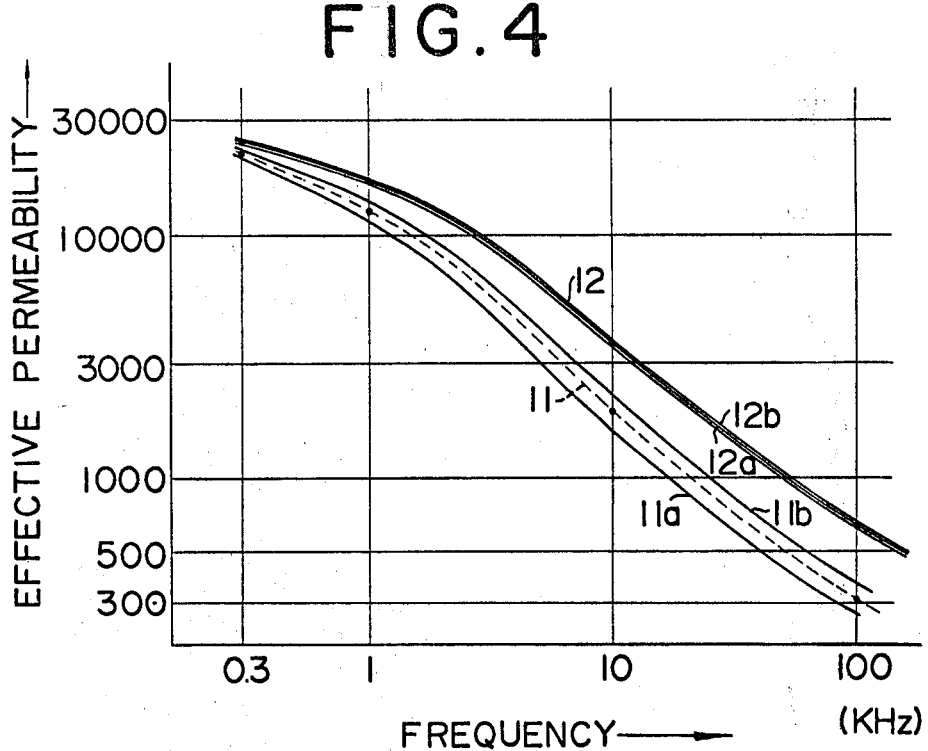
FIG. 4 is a chart of effective permeability-frequency relationship in a comparison of the head of the present invention with a conventional magnetic head.

In FIG. 1 there is shown, in a perspective view, a head core composed of core halves 1, 2 and provided partially thereon with a coil 3. The thin plates 1a, 1b, 1c and 1d constituting said core half 1 are respectively composed of a material of a high magnetic permeability such as permalloy (hardness Hv 139) or sendust (hardness Hv 480) of a determined thickness and are provided on the surfaces thereof with an insulating adhesive layer of an abrasion resistance higher than that of said high permeability material and of a thickness sufficiently smaller than the above-mentioned determined thickness of thin plates. The core half 1 formed in this manner from the laminated thin plates 1a–1d with interleaved adhesive layers is adjoined to another core half 2 similar to said core half 1 as shown by the chain lines to form a core gap 4, whereby said core halves 1 and 2 constituting a closed magnetic circuit.

In FIG. 2 there is shown, in a partial perspective view, the magnetic head of the present invention composed of the core halves, 1, 2 and coil 3 of FIG. 1 which are placed in a head case 6 and fixed therein by means of a fixing material 7 filled into said case.

FIG. 3 is a cross-sectional view of the magnetic head in FIG. 2 along the chain line 5 and seen from the direction of arrow A, wherein there are additionally shown a tape pad 8 and a magnetic tape 9. In FIG. 3 the aforementioned adhesive 10 is present in the spaces between said thin plates 1a–1d to mutually adhere said thin plates of a high magnetic permeability and to mutually insulate said thin plates thereby reducing the eddy current loss therein. Said adhesive 10 is for example composed of an insulating and adhesive epoxy resin comprising a granular substance of a particle size in a range of 0.5 to 15 microns. Said granular substance is an inorganic material composed of at least a member selected from metal oxides such as $SiO_2$, $Al_2O_3$ (hardness Hv 1950), $Zr(SiO_4)$, $Al_2O_3$—$SiO_2$ compounds (each of the following compounds is understood to include all the family compounds), $Al_2O_3$—MgO (MgO hardness Hv 600), $Al_2O_3$—MgO—$SiO_2$, MgO—$SiO_2$, $K_2O$—$Al_2O_3$—$SiO_2$, Ti—O, Zr—O, Hf—O, V—O, Nb—O, Ta—O, Cr—O, Pd—O, Re—O, Mo—O, W—O, Mn—O, Fe—O, Co—O, Rh—O, Ir—O, Ni—O, Pt—O, Ti—Zr—O, Ti—Hf—O, Ti—Ta—O, Ti—Co—O, Ti—V—O, Ti—Nb—O, Ti—W—O, Ti—Mn—O, Ti—Fe—O, Zr—Hf—O, Zr—V—O, Zr—Nb—O, Zr—Ta—O, Zr—Cr—O, Zr—Co—O, Zr—Mo—O, Zr—W—O, Zr—Mn—O, Zr—Re—O, Zr—Fe—O, Zr—Co—O, Zr—Ni—O, V—Nb—O, V—Ta—O, V—Cr—O, V—Mo—O, V—W—O, V—Mn—O, V—Re—O, V—Fe—O, V—Co—O, V—Ni—O, Nb—Ta—O, Nb—Cr—O, Nb—Mo—O, Nb—W—O, Nb—Mn—O, Nb—Re—O, Nb—Fe—O, Nb—Co—O, Nb—Ni—O, Ta—Cr—O, Ta—Mo—O, Ta—W—O, Ta—Mn—O, Ta—Re—O, Ta—Fe—O, Ta—Co—O, Ta—Ni—O, Cr—Mo—O, Cr—W—O, Cr—Mn—O, Cr—Re—O, Cr—Fe—O, Cr—Co—O, Cr—Ni—O, Mo—W—O, Mo—Mn—O, Mo—Fe—O, Mo—Co—O, Mo—Ni—O, W—Mn—O, W—Re—O, W—Fe—O, W—Co—O, W—Ni—O, Mn—Re—O, Mn—Co—O, Mn—Ni—O, Re—Fe—O, Re—Co—O, Re—Ni—O, Co—Ni—O etc., metal carbides such as Ti—C (hardness Hv 3000), Zr—C, Hf—C, V—C, Nb—C, Ta—C, Cr—C, Mo—C, W—C, Mn—C, Fe—C, Fe—W—C, Fe—Mo—C, Co—Fe—C, Co—Mo—C, Ni—W—C, V—Zr—C, Cr—Nb—C, Mn—Mo—C, Mn—W—C, Ni—Mo—C etc., metal nitrides such as Ti—N, Zr—N, V—N, Nb—N, Ta—N, Cr—N, Mo—N, W—N, Mn—N, Fe—N, Co—N, Ti—Zr—N, Ti—Hf—N, Ti—V—N, Ti—Nb—N, Ti—Ta—N, Ti—Co—N, Ti—Ni—N, Zr—Nb—N, V—Nb—N, V—Ta—N, Ta—Cr—N, Ta—Mn—N, Ta—Fe—N, Ta—Co—N, Ta—Ni—N, Cr—Mo—N, Cr—Mn—N, Cr—Fe—N, Mo—(Mn, Fe, Co, Ni)—N, Mo—Co—N, Mo—Ni—N, Mn—Fe—N, Fe—Ni—N, Fe—Pd—N etc., metal borides such as Ti—B, Zr—B, Hf—B, V—B, Nb—B, Ta—B, Cr—B, Mo—B, W—B, Mn—B, Ni—B, Pd—B, Ti—Zr—B, Ti—Hf—B, Zr—Hf—B, Ti—V—B, Ti—Nb—B, Ti—Ta—B, Ti—Cr—B, Ti—Mo—B, Zr—Nb—B, Zr—Ta—B, Zr—Mo—B, V—Cr—B, Nb—Cr—B, Ta—Cr—B, Ta—Fe—B, Ta—Co—B, Ta—Ni—B, Cr—Mo—B, Cr—Mn—B, Cr—Fe—B, Cr—Co—B, Cr—Ni—B, Mo—Fe—B, Mo—Co—B, Mo—Ni—B, Mn—Fe—B, Mn—Co—B, Mn—Ni—B, Fe—Co—B, Mo—Al—B, Co—Al—B, Ni—Al—B, Co—Mg—B, Ni—Mg—B, Co—Zn—B, Ni—Zn—B, Co—Ga—B, Ni—Ga—B, Co—Ge—B, Ni—Ge—B, Co—Sn—B, Ni—Sn—B, Co—In—B, Ni—In—B etc., and metal silicides such as T—Si (hardness Hv 700), Zr—Si, Hf—Si, V—Si, Nb—Si, Ta—Si, Cr—Si, Mo—Si, W—Si, Mn—Si, Fe—Si, Co—Si, Rh—Si, Ir—Si, Ni—Si, Pb—Si, Pt—Si, Ti—Zr—Si, Ti—Hf—Si, Ti—V—Si, Ti—Ta—Si, Ti—Cr—Si, Ti—Mo—Si, Ti—W—Si, Ti—Ni—Si, Ti—Mn—Si, Ti—Re—Si, Zr—V—Si, Zr—Nb—Si, Zr—Ta—Si, Zr—Mo—Si, Zr—W—Si, Hf—W—Si, Zr—Co—Si, Zr—Ni—Si, Hf—Ni—Si, Zr—Fe—Si, Hf—Fe—Si, V—Nb—Si, V—Mo—Si, V—Mn—Si, V—Fe—Si, V—Co—Si, V—Ni—Si, Nb—Gr—Si, Ta—Cr—Si, Ta—Mo—Si, Nb—W—Si, Ta—W—Si, Nb—Fe—Si, Nb—Co—Si, Ta—Co—Si, Nb—Ni—Si, Ta—Ni—Si, Nb—Mo—Si, Cr—Mo—Si, Cr—W—Si, Cr—Mn—Si, Cr—Fe—Si, Cr—Co—Si, Cr—Ni—Si, Mo—W—Si, W—Mn—Si, Mo—Fe—Si, Mo—Fe—Si, W—Fe—Si, Mo—Co—Si, W—Co—Si, Mo—Ni—Si, W—Ni—Si etc. The amount of such inorganic granular substance should at least equal to 20% for achieving a satisfactory effect, but at the same time should not exceed 70% in order to avoid deterioration of the adhesion to the thin plates and also to prevent inefficient coating work at a high viscosity. Consequently the preferred range of the amount of said inorganic granular substance is from 20 to 70%.

The inorganic granular substance of a particle size in excess of 15 microns will excessively enlarge the spacing between the thin plates and thus will deteriorate the sensitivity of the magnetic head since the effective thickness of the magnetic layer on the tape contact face is reduced for a given track width. Also the presence of such large granules will locally reduce the amount of resinous binder, thereby reducing the adhering force thereof.

On the other hand the granules of a size smaller than 0.5 microns can only be mixed in a limited amount with the epoxy resin due to significant increase in the viscosity and are therefore unable to perform sufficient stress relaxation. Also a minimum particle diameter of 0.5 microns is required in order to prevent mutual contact of the high permeability thin plates which generally show surface irregularity in the order of ±0.2 microns. Consequently the preferred range for the particle size of said inorganic granular substance is from 0.5 to 15 microns. In this manner the above-explained adhesive layer employed in the magnetic head of the present invention shows satisfactory electric insulation, abrasion resistance, coating efficiency, adhering force and stress relaxation, wherein said stress relaxation functions to prevent the eventual deformation of core at the hardening of the resinous binder, thereby preventing the loss in the effective magnetic permeability.

FIG. 4 shows the plotting of effective permeability in ordinate against frequency in abscissa, wherein the curve 11 shows the results of measurements on a conventional ring-shaped core sample laminated with an epoxy resin alone while the curve 12 shows those of a ring-shaped core sample laminated with an epoxy resin containing powdered alumina ($Al_2O_3$) of an average particle size of 1 micron in an amount of 30% by weight. It will be observed that the curve 12 shows a higher permeability in the entire frequency range of 0.3-100 KHz, particularly at the high frequency region. Also the smaller separation between the curves 12a and 12b than between the curves 11a and 11b indicates the smaller fluctuation of characteristics between multiple core samples. This result will be ascribable to a fact that the granular substance of a large surface area absorbs a considerable portion of the stress generated by the contraction of the resin, thereby relaxing the stress appearing on the core surface. Also said granular substance prevents the mutual contact between the adjacent thin plates, thereby reducing the eddy current loss therein and preventing the deterioration of the high frequency characteristics. In the absence of such granular substance, the eventual surface irregularities present on said thin plates tend to cause mutual contact of said thin plates through pinholes or uneven spots of the adhesive layer. In this manner the magnetic head of the present invention utilizing the laminated thin plates added with said inorganic granular substance is provided with an improved sensitivity in the high frequency region and with a reduced high frequency bias current. Also by rendering the thickness of said adhesive 10 (dimension in the lateral direction in FIG. 3) satisfactorily smaller than the thickness of said thin plate (dimension in the lateral direction in FIG. 3), the contact area between the high permeability material and the magnetic tape can be increased to avoid the loss of sensitivity.

Figure 5:
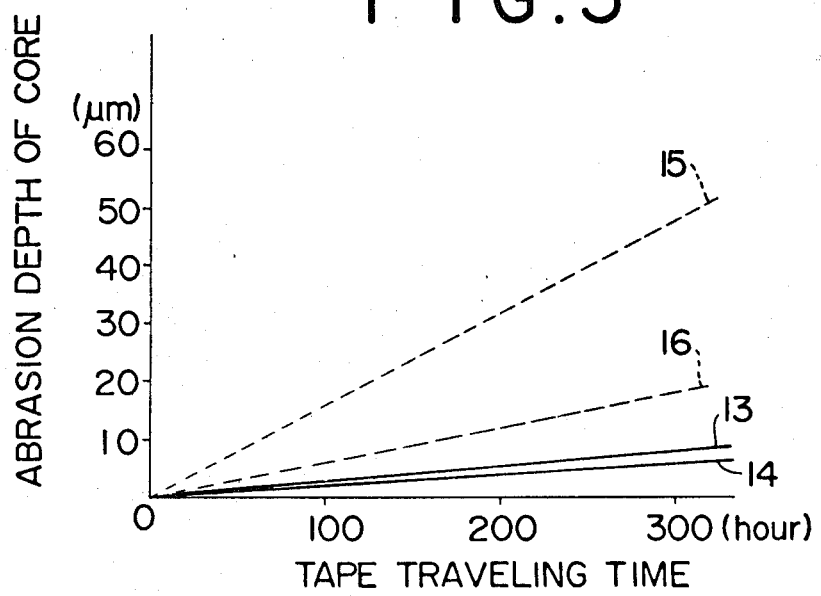
FIG. 5 is a chart showing a relationship of the abraded depth of the core vs. the tape traveling time in the comparison of the magnetic head of the present invention with that of a conventional head.

FIG. 5 shows the abrasion depth of magnetic core as a function of tape running time at a tape speed of 4.75 cm/sec. wherein the line 13, representing a first example of the present invention with a track width of ca. 0.6 mm prepared by laminating six hard permalloy plates each 0.1 mm thick and respectively coated with an adhesive in a thickness of 0.001 mm having a higher hardness and a higher abrasion resistance than said hard permalloy, shows abrasion depth of 8 microns at a running time of 300 hours, while the line 15 representing an identical example except for utilizing another adhesive of a lower abrasion resistance shows an abrasion depth of 48 microns after a running time of 300 hours. Also a second example of the magnetic head of the present invention with a track width of ca. 0.6 mm, prepared by laminating two high permeability sendust thin plate each 0.3 mm thick and respectively coated with an adhesive in a thickness of 0.01 mm having a higher hardness and a higher abrasion resistance than said sendust, shows an abrasion depth of 6 microns after a running time of 300 hours as shown by the line 14, while an identical head except for employing an adhesive of an abrasion resistance lower than that of said sendust shows an abrasion depth of 18 microns after a running time of 300 hours as shown by the line 16. Also the heads of the first and second examples of the present invention show almost no change in the electromagnetic converting characteristics before and after the running test.

Although the foregoing examples utilize plural laminated thin plates, it is also possible to improve the abrasion resistance even when a single plate of high magnetic permeability is employed if said plate is coated on both sides thereof with an adhesive material of a high abrasion resistance. For example, the core is of a non-laminated structure for a magnetic head with a track width of 0.1-0.03 mm such as a video recording head, but also in such case the abrasion of the core can be reduced by coating an adhesive as aforementioned on both sides of the core plate. Thus, as explained in the foregoing, it is rendered possible to realize a magnetic head with an extended service life without deteriorating the electromagnetic converting characteristics by selecting the abrasion resistance of said adhesive higher than that of the said high permeability thin plates and also selecting the thickness of said adhesive satisfactorily smaller than that of said thin plates.

Figure 7:
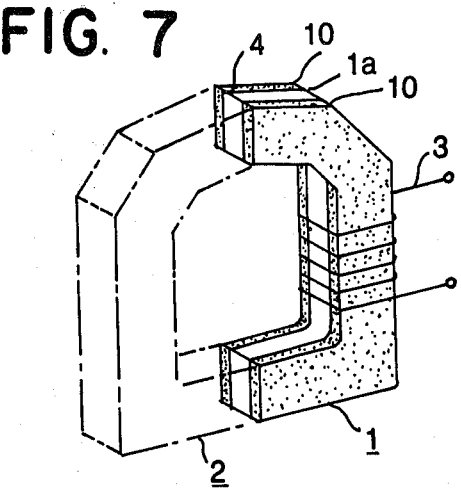
FIG. 7 is a perspective view of a head element of the present invention, similar to that shown in FIG. 1, but wherein only a single magnetically permeable plate is provided.
Figure 8:
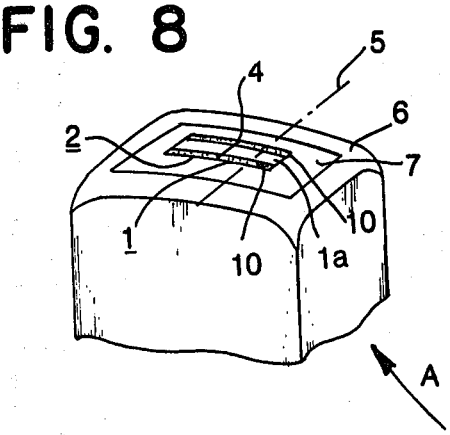
FIG. 8 is a perspective view of the head element shown in FIG. 7 placed in a head casing.
Figure 9:
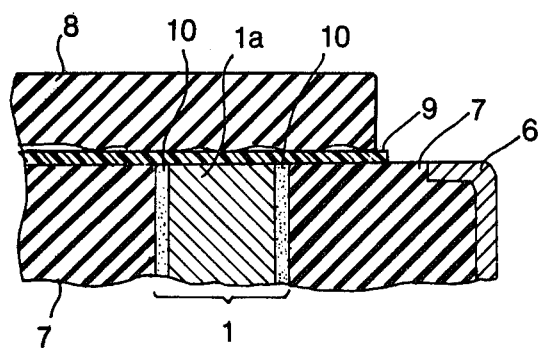
FIG. 9 is a cross-sectional view of the magnetic head of FIG. 8 in contact with a magnetic tape and tape pad.

In this regard, reference is made to FIGS. 7, 8 and 9, showing a single plate embodiment of the invention, wherein the same reference numerals are used to refer to elements corresponding to those shown in FIGS. 1, 2 and 3.

FIGS. 6a and 6b are cross-sectional views of the magnetic head of FIG. 2 along the chain line 5 and seen from the direction of arrow A, wherein said head is constructed with four channels, and c and d representing the boundaries of the contact area with the magnetic tape. FIG. 6a illustrates the cross section of a conventional multichannel magnetic head as a reference, wherein the chain line 17a and the full line 17b respectively indicate the tape contact surfaces before and after the abrasion test, while FIG. 6b illustrates the cross section of the magnetic head of the present invention, wherein the line 18a and the full line 18b respectively indicate the tape contact surfaces before and after the abrasion test. In FIGS. 6a and 6b the abrasion is caused by a running test for 200 hours with an unrepresented magnetic tape with a tape speed of 4.75 cm/sec, and the vertical dimension is enlarged 100 times with respect to the horizontal dimension in order to clarify the state of abrasion. From the comparison of these two drawings it will be apparent that the magnetic head of the present invention, shown in FIG. 6b has a superior abrasion resistance. In this third example of the present invention shown therein, the adhesive 10a is provided in the spacings between the laminated thin plates 1a-1d to electrically insulate the adjacent thin plates of a high permeability thereby reducing the eddy current loss therein and also to improve the abrasion resistance. Said adhesive 10a is composed of an epoxy resin added with an inorganic granular substance consisting of at least a member selected from the aforementioned metal oxides, metal carbides, metal nitrides, metal borides, and metal silicides. Said inorganic granular substance is preferably added in an amount within a range from 20 to 70% as already explained in connection with FIG. 3, and is most preferably composed of alumina.

The fixing material 7a is composed of an epoxy resin added with $SiO_2$ (silica) in an amount of 20-50 wt. % or $Al_2O_3$ (alumina) in an amount of 1-5 wt. %. Further $CaCO_3$ (calcium carbonate) is added in such a manner that the total amount of the above-mentioned additives represents 30-80 wt. % of the mixture, in order to prevent time-dependent deteriorating and to relax the stress caused by the contraction at the hardening.

The magnetic head of the present invention prepared with the adhesive and the fixing material of the above-explained compositions is provided with an elevated abrasion resistance at the tape contact surface and is abraded evenly on said surface as shown in FIG. 6b. Consequently it is rendered possible to maintain satisfactory magnetic characteristics over a prolonged period and thus to achieve an extended service life.

What we claim is:

1. A magnetic head, comprising:
  a head core including a plurality of core halves joined to each other, each of said core halves comprising at least one thin plate of predetermined thickness composed of a high-magnetic permeability material and at least two adhesive layers adhered to and solidified on opposing surfaces of said plate, said adhesive layers being composed of an electrically insulative resin and fine inorganic granular particles of a material harder than said high magnetic permeability material, said particles being added to said resin in an amount of from 20 to 70 percent by weight of said resin such that said adhesive layers have a higher degree of abrasion resistance than said plate, the thickness of said adhesive layers being in a range of from one-hundredth to one-thirtieth said predetermined thickness of said plate;
  a coil wound on said head core;
  a case enclosing said head core and coil; and
  a fixing material for enclosing said head core and said coil within said case, said fixing material comprising a second resin mixed and solidified with a powder chosen from the group consisting of powdered $SiO_2$ and powdered alumina and said fixing material having a degree of hardness intermediate the relatively low degree of hardness of said high-magnetic permeability material and the relatively high degree of hardness of said adhesive layers, such that the hardness of the fixing material approximates the average hardness of the plate and adhesive layers in composite and such that said plate, said adhesive layers and said fixing material all abrade at a substantially uniform rate, whereby degradation of performance due to uneven abrasion of said plate, said layers, and said fixing material is mitigated.

2. The magnetic head of claim 27, wherein there are provided a plurality of said thin plates of high-magnetic permeability material and wherein said adhesive layers are interleaved therebetween.

3. A magnetic head in accordance with claims 1 or 2, wherein said electrically insulative resin comprises an epoxy resin, and said fine inorganic particles comprise fine alumina particles which are added to said epoxy resin in said amount of from 20 to 70 percent by weight of said epoxy resin, and wherein said second resin comprises a second epoxy resin to which said powdered $SiO_2$ is added in an amount of from 20 to 50 percent by weight of said second epoxy resin.

4. A magnetic head in accordance with claim 3, wherein said second epoxy resin further includes powdered $CaCO_3$ in such an amount that said powdered $SiO_2$ and $CaCO_3$ are present, in total, in said second epoxy resin in an amount of from 30 to 80 percent by weight of said second epoxy resin.

5. A magnetic head in accordance with claims 1 or 2, wherein said electrically insulative resin comprises an epoxy resin, and said fine inorganic particles comprise fine alumina particles which are added to said epoxy resin in said amount of from 20 to 70 percent by weight of said epoxy resin, and wherein said second resin comprises a second epoxy resin to which said powdered alumina is added in an amount of from 1 to 15 percent by weight of said second epoxy resin.

6. A magnetic head in accordance with claim 5, wherein said second epoxy resin further includes powdered $CaCO_3$ in such an amount that said powdered alumina and $CaCO_3$ are present, in total, in said second epoxy resin in an amount of from 30 to 80 percent by weight of said second epoxy resin.

* * * * *

UNITED STATES PATENT AND TRADEMARK OFFICE
CERTIFICATE OF CORRECTION

PATENT NO. : 4,413,295

DATED : NOVEMBER 1, 1983

INVENTOR(S) : HIROAKI KATO, ET AL.

It is certified that error appears in the above-identified patent and that said Letters Patent is hereby corrected as shown below:

Column 2

Lines 49 and 53, change "." at the end of each line to --;--.

Line 55, after "casing", change "." to --; and--.

Column 4

Line 28, change "Mo-Fe-Si", first occurrence, to --Mo-Re-Si--,

Line 31, change "at least equal to 20%" to --at least be equal to 20%--.

Column 6

Line 23, change "multichannel" to --multi-channel--.

Signed and Sealed this

Third Day of July 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,413,295

DATED : NOVEMBER 1, 1983

INVENTOR(S) : HIROAKI KATO, ET AL.

It is certified that error appears in the above-identified patent and that said Letters Patent is hereby corrected as shown below:

Column 8

Line 4, change "claim 27" to --claim 1--.

Signed and Sealed this

Third Day of July 1984

[SEAL]

Attest:

GERALD J. MOSSINGHOFF

Attesting Officer

Commissioner of Patents and Trademarks